Patented Aug. 7, 1945

2,381,139

UNITED STATES PATENT OFFICE 2,381,139

RESOLUTION OF AZEOTROPIC MIXTURES OF CHLOROSILANES

Robert O. Sauer, Schenectady, N. Y., assignor to General Electric Company, a corporation of New York No Drawing. Application May 14, 1942, Serial No. 443,024

3 Claims. (Cl. 260—462)

The present invention relates to a method of resolving an azeotropic mixture of chlorosilanes. It is specifically concerned with the separation of a constant boiling mixture of trimethylchlorosilane and tetrachlorosilane (silicon tetrachloride).

In the preparation of methyl silicon chloride by effecting reaction between silicon and methyl chloride in accordance with the processes described and claimed in the copending applications of Eugene G. Rochow, Serial No. 412,459, and Eugene G. Rochow and Winton I. Patnode, Serial No. 412,460, filed September 26, 1941, and assigned to the same assignee as the present invention, the reaction products comprise a mixture of chlorosilanes including various methyl chlorosilanes and tetrachlorosilane.

It has been found that these chlorosilane mixtures can not be completely separated into their various components by fractional distillation because the trimethylchlorosilane and tetrachlorosilane components not only have approximately the same boiling points (about 57.5° C.) but also form a constant boiling mixture distilling at a temperature of about 54.5° C. As the trimethyl compound and its derivatives are particularly useful for many commercial applications where the presence of tetrachlorosilane can not be tolerated, it was highly desirable that some means be found for resolving this azeotrope without subjecting the compounds to hydrolyzing or resinifying conditions.

An obvious method of separation would seem to be the formation of the corresponding ethers by alcoholysis, using anhydrous alcohols, followed by fractional distillation of the products. However, this method proved to be either inoperative or commercially impracticable. With the common alcohols, such as the methyl, ethyl and butyl alcohols, the resulting ethers of the trimethyl silicon derivative formed constant boiling mixtures with the excess unreacted alcohol. The alcohols and dissolved hydrogen chloride could not be easily removed from these mixtures by washing with water without considerable hydrolysis of the trimethyl silicon compound. Other common alcohols such as ethyl alcohol could not be used commercially because the water ordinarily contained therein quickly hydrolyzed the silicon halides.

I have now discovered that the resolution of the azeotropic mixture of the above-mentioned chlorosilanes may be accomplished under anhydrous conditions by treating the mixture with ethylene oxide to convert the components thereof to the corresponding 2-chloroethoxy derivatives, and fractionating the resulting products. The trimethyl silicon derivative, i. e., the trimethyl-2-chloroethoxysilane, can be easily hydrolyzed and may be used in place of trimethylchlorosilane in any application involving hydrolysis of this silicon compound. On the other hand, if the chloride is specifically desired, it may be regenerated by treating the chloroethoxy compound with an organic acid chloride in a manner more fully described hereinafter.

In accordance with my invention, the constant boiling mixture of trimethyl chlorosilane and tetrachlorosilane, in which the mol fraction of the trimethyl compound is approximately 0.45, is treated with ethylene oxide in a manner more fully described in the copending applications of Winton I. Patnode and Robert O. Sauer, Serial Nos. 443,022 and 443,023, filed concurrently herewith and assigned to the same assignee as the present invention. These applications respectively describe and claim a process of preparing 2-chloroethyl silicate from silicon tetrachloride and new chemical compounds derived from organo-chlorosilanes by reaction thereof with ethylene oxide.

A suitable apparatus for use in carrying out the reaction between the ethylene oxide and the azeotropic mixture of the two chlorosilanes comprises a glass reaction vessel equipped with a reflux condenser (water-cooled) and a gas inlet tube extending to the bottom of the vessel. The azeotropic mixture is placed in this vessel and an excess of ethylene oxide gas is slowly bubbled through the mixture preferably held at a somewhat elevated temperature, for example 65–85° C., for about 10 hours or until the reaction mass contains substantially no active chlorine. The product is fractionally distilled, usually at a reduced pressure, to recover the trimethyl-2-chloroethoxysilane boiling at about 134° C. at 760 mm. (55–56° C./50 mm.). The tetrakis-2-chloroethyl silicate subsequently distills over at a temperature of about 184° C./7 mm. (153–4° C./2 mm.).

If it is desired to regenerate the respective chlorosilanes, this may be accomplished by treating the chloroethoxy derivative with an organic acid chloride. For example, by heating the trimethyl-2-chloroethoxysilane with an equimolar amount of benzoyl chloride under reflux at a temperature of about 100° C. and in the presence of a suitable catalyst such as pyridine or a pyridine salt, e. g., pyridine phosphate, good yields of trimethylchlorosilane may be obtained.

The same degree of care should be used in storing the 2-chloroethoxysilanes as is used with the chlorosilanes. The chloroethoxy derivatives are hygroscopic and storage thereof for any length of time in contact with air results in a partial or complete hydrolysis thereof.

What I claim as new and desire to secure by Letters Patent of the United States is:

1. The method of resolving an azeotropic mixture of trimethylchlorosilane and tetrachlorosilane which comprises converting the chlorosilanes to the corresponding chloroethoxy derivatives by reaction thereof at an elevated temperature with ethylene oxide and separating the said chloroethoxy derivatives by fractional distillation.

2. The method which comprises effecting reaction at an elevated temperature between ethylene oxide and a constant boiling mixture of trimethylchlorosilane and tetrachlorosilane and separating the chloroethoxy silanes so formed by fractional distillation.

3. The method of resolving an azeotropic mixture of trimethylchlorosilane and tetrachlorosilane which comprises effecting reaction at an elevated temperature between said chlorosilanes and ethylene oxide to form trimethyl-2-chloroethoxysilane and tetra-2-chloroethoxysilane, separating said chloroethoxy silanes by fractional distillation, recovering the trimethyl-2-chloroethoxysilane, and effecting reaction of said trimethyl-2-chloroethoxysilane with an organic acid chloride at reflux temperatures to form trimethylchlorosilane.

ROBERT O. SAUER.